US008667677B2

(12) United States Patent
Buck

(10) Patent No.: US 8,667,677 B2
(45) Date of Patent: Mar. 11, 2014

(54) METHOD FOR A TOP-LOADED ASSEMBLY OF AN INTERNAL COMBUSTION ENGINE

(76) Inventor: Kenneth M. Buck, Winterville, NC (US)

( * ) Notice: Subject to any disclaimer, the term of this patent is extended or adjusted under 35 U.S.C. 154(b) by 0 days.

(21) Appl. No.: 13/427,786

(22) Filed: Mar. 22, 2012

(65) Prior Publication Data

US 2012/0174399 A1 Jul. 12, 2012

Related U.S. Application Data

(62) Division of application No. 12/493,551, filed on Jun. 29, 2009, now Pat. No. 8,316,814.

(51) Int. Cl.
*B23K 3/00* (2006.01)

(52) U.S. Cl.
USPC ..................... 29/888.012; 29/888; 29/888.01; 123/41.72; 123/78 R; 123/195 R

(58) Field of Classification Search
USPC ............. 29/888, 888.01, 888.012; 123/41.84, 123/41.72, 668, 195 R, 90.1, 78 R, 48 C, 123/142.5 R
See application file for complete search history.

(56) References Cited

U.S. PATENT DOCUMENTS

| | | | |
|---|---|---|---|
| 632,950 | A | 9/1899 | Spence |
| 898,678 | A | 9/1908 | Piggins |
| 900,063 | A | 10/1908 | Clark |
| 904,562 | A | 11/1908 | Raithbun |
| 1,145,995 | A | 7/1915 | Johnson |
| 1,163,571 | A | 12/1915 | Kraus |
| 1,260,847 | A | 3/1918 | Winton |
| 1,291,313 | A | 1/1919 | Weiss |
| 1,408,179 | A | 2/1922 | Du Pont |
| 1,433,821 | A | 10/1922 | Hull |
| 1,622,965 | A | 3/1927 | Napier et al. |
| 1,624,497 | A | 4/1927 | McAllister |
| 1,814,676 | A | 7/1931 | Estep |
| 1,850,246 | A | 3/1932 | Simmen |
| 1,906,765 | A | 5/1933 | Purkey |
| 2,199,423 | A | 5/1940 | Taylor |
| 2,423,602 | A | 7/1947 | Megdeburger |
| 2,455,493 | A | 12/1948 | Jacobs |
| 2,491,630 | A | 12/1949 | Voorhies |
| 2,712,483 | A | 7/1955 | Ciaccia |
| 2,793,625 | A | 5/1957 | Kolbe |
| 2,858,667 | A | 11/1958 | Reske |
| 3,136,306 | A | 6/1964 | Kamm |

(Continued)

OTHER PUBLICATIONS

Lee, Yi-Kuen; Yi, Ui-Cong; Tseng, Fan-Gang: Kim, Chang-Jin "CJ"; Ho, Chih-Ming, "Fuel Injection by a Thermal Microinjector", Mechanical and Aerospace Engineering Department, University of California, Los Angeles, CA; cjkim@seas.ucia.edu.

(Continued)

*Primary Examiner* — Richard Chang
(74) *Attorney, Agent, or Firm* — Jerome R. Drouillard

(57) ABSTRACT

A method for top-loaded assembly of an internal combustion engine includes providing a carrier base having a lower portion configured as a crankcase and an upper portion having a number of upwardly directed assembly provisions such as a crankshaft bay and at least one cylinder deck. Arranging the crankshaft bay and cylinder deck so that the engine may be assembled from a position above the engine, without the necessity of attaching connecting rods or crankshaft main bearing bolts from underneath the engine.

6 Claims, 4 Drawing Sheets

(56) References Cited

U.S. PATENT DOCUMENTS

| | | | | |
|---|---|---|---|---|
| 3,169,365 | A | | 2/1965 | Benjamen |
| 3,396,653 | A | | 8/1968 | Foster |
| 3,946,697 | A | | 3/1976 | Hackbarth et al. |
| 4,015,908 | A | | 4/1977 | Ashley |
| 4,029,071 | A | | 6/1977 | Saito et al. |
| 4,033,016 | A | | 7/1977 | Mayer |
| 4,041,919 | A | | 8/1977 | Bonin |
| 4,054,108 | A | | 10/1977 | Gill |
| 4,068,612 | A | | 1/1978 | Meiners |
| 4,133,284 | A | | 1/1979 | Holcroft |
| 4,135,478 | A | | 1/1979 | Rassey |
| 4,179,884 | A | | 12/1979 | Koeslin |
| 4,187,678 | A | | 2/1980 | Herenius |
| 4,198,947 | A | | 4/1980 | Rassey |
| 4,214,443 | A | | 7/1980 | Herenius |
| 4,220,121 | A | | 9/1980 | Maggiorana |
| 4,268,042 | A | | 5/1981 | Borlan |
| 4,286,931 | A | | 9/1981 | Hafele et al. |
| 4,306,614 | A | | 12/1981 | Maggiorana |
| 4,308,834 | A | | 1/1982 | Eheim |
| 4,348,991 | A | | 9/1982 | Stang et al. |
| 4,385,594 | A | | 5/1983 | Hauser, Jr. |
| 4,437,444 | A | | 3/1984 | Yasuhara |
| 4,449,503 | A | | 5/1984 | Luscomb |
| 4,459,945 | A | | 7/1984 | Chatfield |
| 4,490,098 | A | | 12/1984 | Freudenschuss et al. |
| 4,497,298 | A | | 2/1985 | Ament |
| 4,534,241 | A | | 8/1985 | Remmerfelt et al. |
| 4,535,592 | A | | 8/1985 | Zinsmeyer |
| 4,539,956 | A | | 9/1985 | Hengel et al. |
| 4,562,697 | A | | 1/1986 | Lawson |
| 4,565,175 | A | | 1/1986 | Kaye |
| 4,596,179 | A | | 6/1986 | Bando |
| 4,621,594 | A | | 11/1986 | Kubis |
| 4,622,864 | A | | 11/1986 | Fetouh |
| 4,699,112 | A | | 10/1987 | Filippi et al. |
| 4,700,047 | A | | 10/1987 | Crossett et al. |
| 4,704,949 | A | | 11/1987 | Foster |
| 4,711,088 | A | | 12/1987 | Berchem et al. |
| 4,712,985 | A | | 12/1987 | Wakasa et al. |
| 4,742,801 | A | | 5/1988 | Kelgard |
| 4,759,181 | A | | 7/1988 | Biritz |
| 4,763,619 | A | | 8/1988 | Eitel |
| 4,790,731 | A | | 12/1988 | Freudenschuss |
| 4,807,577 | A | | 2/1989 | Koutsoupidis |
| 4,819,606 | A | | 4/1989 | Kawano |
| 4,861,243 | A | | 8/1989 | Wade |
| 4,873,947 | A | | 10/1989 | Ryan, III et al. |
| 4,884,542 | A | | 12/1989 | Konrath et al. |
| 4,913,115 | A | | 4/1990 | Konrath et al. |
| 4,928,656 | A | | 5/1990 | Ausiello |
| 4,961,404 | A | | 10/1990 | Itakura et al. |
| 4,968,220 | A | | 11/1990 | Filippi et al. |
| 5,004,042 | A | | 4/1991 | McMorries, IV et al. |
| 5,014,572 | A | | 5/1991 | Swars |
| 5,060,606 | A | | 10/1991 | Hubbard |
| 5,072,706 | A | | 12/1991 | Eblen et al. |
| 5,095,861 | A | | 3/1992 | Dove, Jr. |
| RE33,870 | E | | 4/1992 | Fittro et al. |
| 5,115,771 | A | | 5/1992 | Ozawa |
| 5,148,675 | A | | 9/1992 | Inman |
| 5,197,188 | A | | 3/1993 | Maus et al. |
| 5,209,208 | A | | 5/1993 | Siebert et al. |
| 5,303,468 | A | | 4/1994 | Cieszkiewicz et al. |
| 5,316,079 | A | | 5/1994 | Hedeen |
| 5,327,858 | A | | 7/1994 | Hausknecht |
| 5,394,854 | A | | 3/1995 | Edmaier et al. |
| 5,415,147 | A | | 5/1995 | Nagle et al. |
| 5,433,178 | A | | 7/1995 | Urmaza |
| 5,463,867 | A | | 11/1995 | Ruetz |
| 5,551,234 | A | | 9/1996 | Ochoizki |
| 5,577,470 | A | | 11/1996 | Leydorf, Jr. et al. |
| 5,706,675 | A | | 1/1998 | Manikowski, Jr. |
| 5,730,093 | A | | 3/1998 | Calka et al. |
| 5,732,665 | A | | 3/1998 | Morrison |
| 5,732,670 | A | | 3/1998 | Mote, Sr. |
| 5,746,270 | A | | 5/1998 | Schroeder et al. |
| 5,813,372 | A | | 9/1998 | Manthey |
| 5,832,991 | A | | 11/1998 | Cesaroni |
| 6,006,730 | A | | 12/1999 | Rutke et al. |
| 6,009,850 | A | | 1/2000 | DeLuca |
| 6,016,790 | A | | 1/2000 | Makino et al. |
| 6,027,312 | A | | 2/2000 | Djordjevic |
| 6,073,862 | A | | 6/2000 | Touchette et al. |
| 6,098,576 | A | | 8/2000 | Nowak, Jr. et al. |
| 6,116,026 | A | | 9/2000 | Freese |
| 6,123,144 | A | | 9/2000 | Morman et al. |
| 6,178,936 | B1 | | 1/2001 | Kouchi et al. |
| 6,182,643 | B1 | | 2/2001 | Canopy |
| 6,196,181 | B1 | | 3/2001 | Pong |
| 6,227,156 | B1 | | 5/2001 | Autrey et al. |
| 6,543,405 | B2 | | 4/2003 | Sachdev et al. |
| 7,146,724 | B2 | | 12/2006 | Millerman |
| 7,322,320 | B2 | * | 1/2008 | Sugano ...................... 123/41.84 |
| 2006/0005797 | A1 | | 1/2006 | Schubeck |

OTHER PUBLICATIONS

Seatek 600-PLUS 6 Cylinder, Manne Diesel Engine; Feb. 10, 2005; http://bcatdiesel.com/Engines/.

* cited by examiner

METHOD FOR A TOP-LOADED ASSEMBLY OF AN INTERNAL COMBUSTION ENGINE

CROSS REFERENCE TO RELATED APPLICATIONS

This application is Divisional Application which is based upon U.S. patent application Ser. No. 12/493,551, filed Jun. 29, 2009, now U.S. Pat. No. 8,316,814 herein incorporated by reference.

BACKGROUND OF THE INVENTION

1. Field of the Invention

The present invention relates to a multicylinder internal combustion engine which may be assembled from the top side of the engine without the need for accessing internal parts through a lower portion of the engine.

2. Related Art

Reciprocating internal combustion engines utilizing a crankshaft upon which a number of pistons and connecting rods are mounted typically require that assembly of the engine proceed with operations accessed from not only the top portion of the engine, but also the lower portion of the engine. Thus, when mounting a crankshaft within a conventional internal combustion engine, a cylinder block must be accessed from a lower portion of the engine, so as to allow the crankshaft to be placed into contact with the block, and secured with main bearing caps places from underneath the engine. Then, pistons and connecting rods are inserted from the top of the engine; once again the fastenings for the connecting rod caps must be applied from underneath the engine. This assembly technique causes unfortunate problems in the context of many usages of internal combustion engines. For example, in marine usage, it is often very difficult to obtain access to the lower portion of an engine once it has been installed in a vessel. Similarly, with many vehicle usages and even stationary usage of reciprocating engines, access to the lower portion of the crankcase is difficult, which makes it extremely difficult to work on the engine in place. This, in turn, frequently necessitates expensive and time-consuming removal of the engine to allow it to be properly serviced. Moreover, known internal combustion engines which have suffered spun main bearings or other bearing damage often require expensive and technically difficult resurfacing of the main bearing bores. And, extensive damage in the area of the main bearing bores often necessitates the scrapping of motor blocks, at concomitantly high expense.

It would be desirable to provide an internal combustion engine assembled almost completely from the top of the engine, while at the same time offering completely renewable main baring bores, so as to avoid both the need to resurface main bearing bores in the field, as well as the scrapping of engines having heavily damaged main bearing bores.

SUMMARY OF THE INVENTION

According to an aspect of the present invention, an internal combustion engine includes a carrier base having a lower portion configured as a crankcase, and an upper portion having a number of upwardly-directed assembly provisions. A crankshaft is mounted within an upward-opening crankshaft bay of the carrier base. The engine also includes a number of main bearing caps for mounting the crankshaft within the crankshaft bay, and a camshaft carrier mounted upon the main bearing caps. According to another aspect of the present invention, a camshaft is journaled within the camshaft carrier, which further houses a number of valve lifters which are reciprocally housed within the camshaft carrier.

According to another aspect of the present invention, a number of cylinder assemblies are mounted to a least one cylinder deck adjoining the crankshaft bay at the upper portion of the carrier base. The engine also includes a number of piston and connecting rod assemblies, with the connecting rods being attached to the crankshaft and to the pistons, and with the pistons being housed within the cylinder assemblies.

According to another aspect of the present invention, a number of lower bearing sections are secured to the carrier base within the crankshaft bay, with the lower bearing sections cooperating with a number of main bearing caps, also secured to the carrier base within the crankshaft bay, to mount the crankshaft within the crankshaft bay.

According to another aspect of the present invention, a method for topload assembly of an internal combustion engine includes providing a carrier base having a lower portion configured as a crankcase, and an upper portion configured with a number of assembly provisions, and mounting a crankshaft within a crankshaft bay located within the upper portion of the carrier base, with the crankshaft being secured by a number of main bearing caps.

According to another aspect of the present invention, a method for topload assembly of an internal combustion engine further includes mounting a camshaft carrier in the upper portion of the engine upon the main bearing caps, and mounting a number of cylinder assemblies upon cylinder decks located upon the upper portion of the carrier base adjoining the crankshaft bay. Before the cylinder assemblies are mounted to the cylinder decks, pistons and connecting rods will first be attached to the engine's crankshaft through an upper portion of the carrier base.

It is an advantage of a method and system according to the present invention that an internal combustion engine may be assembled and disassembled from the top side of the engine, without the need for performing any significant operations below the crankshaft.

It is yet another advantage of a method and system according to the present invention that the engine may be installed in a more compact space, due to the absence of a need to access the lower portion of the engine in the event that work must be performed on the engine's power cylinders.

Other advantages, as well as features of the present invention, will become apparent to the reader of this specification.

DETAILED DESCRIPTION OF THE PREFERRED EMBODIMENTS

Figure 1:
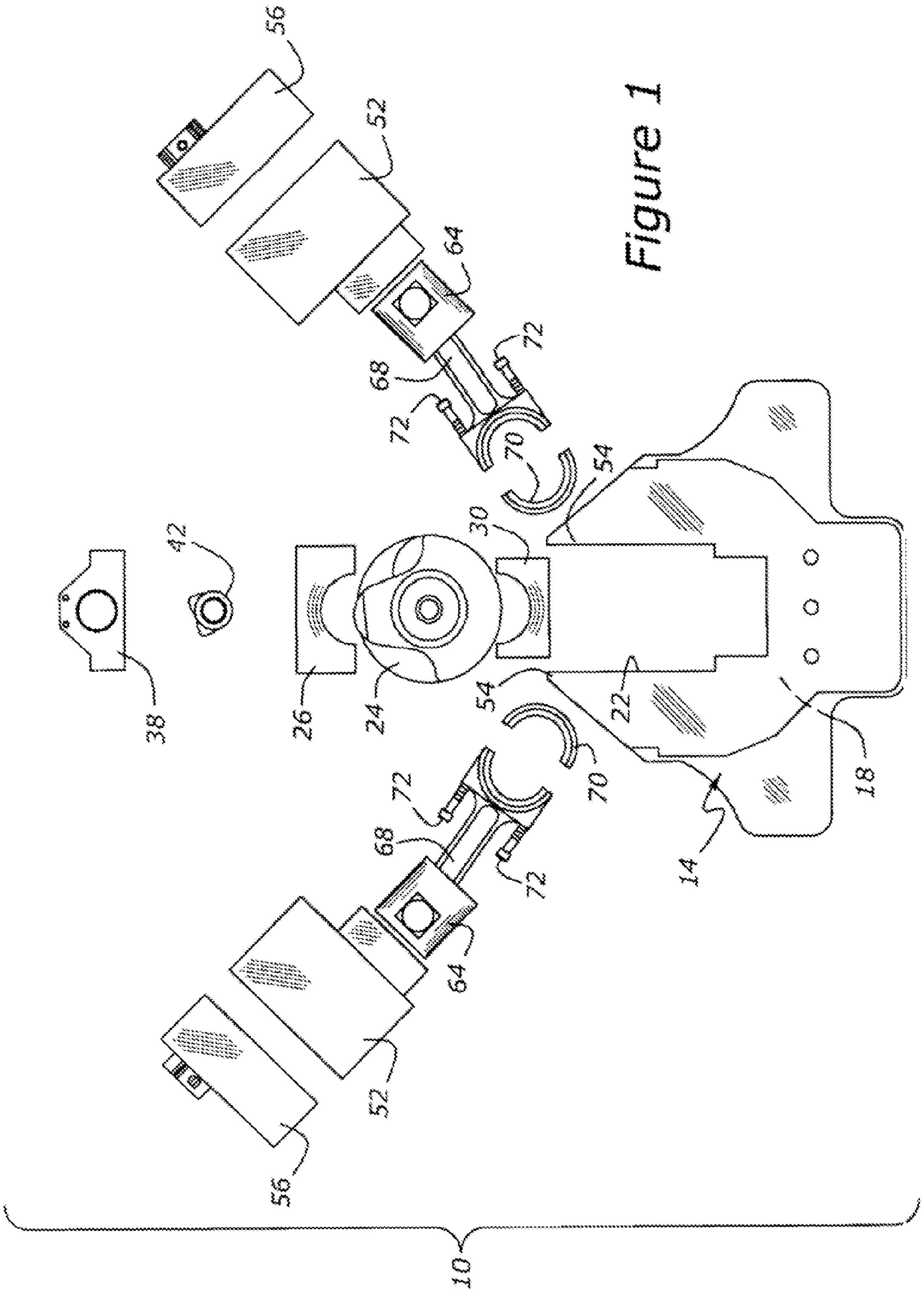
FIG. 1 is an exploded view of top-loading internal combustion engine according to an aspect of the present invention.
Figure 2:
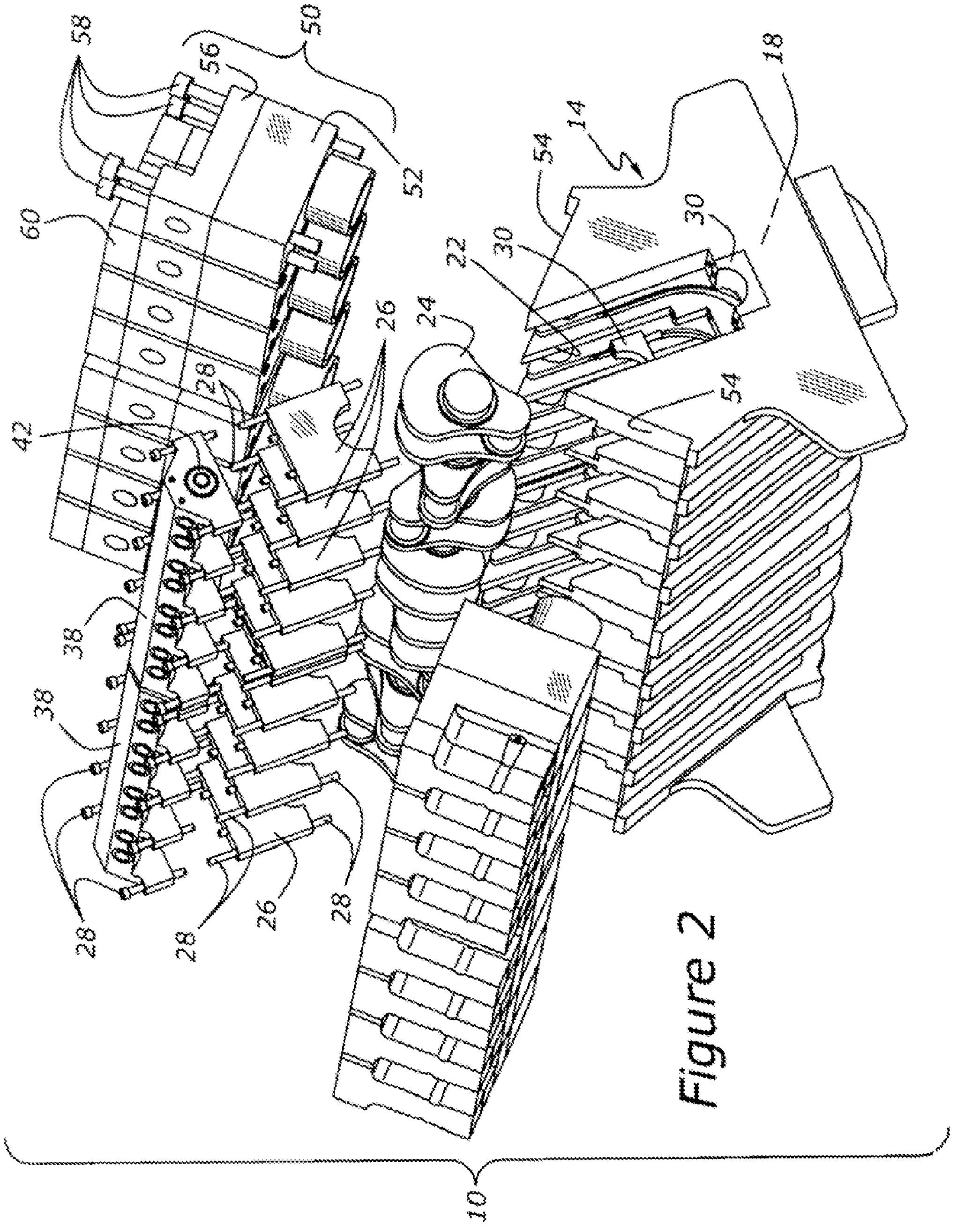
FIG. 2 is a second exploded perspective view of a top-loading internal combustion engine according to the present invention.
Figure 4:
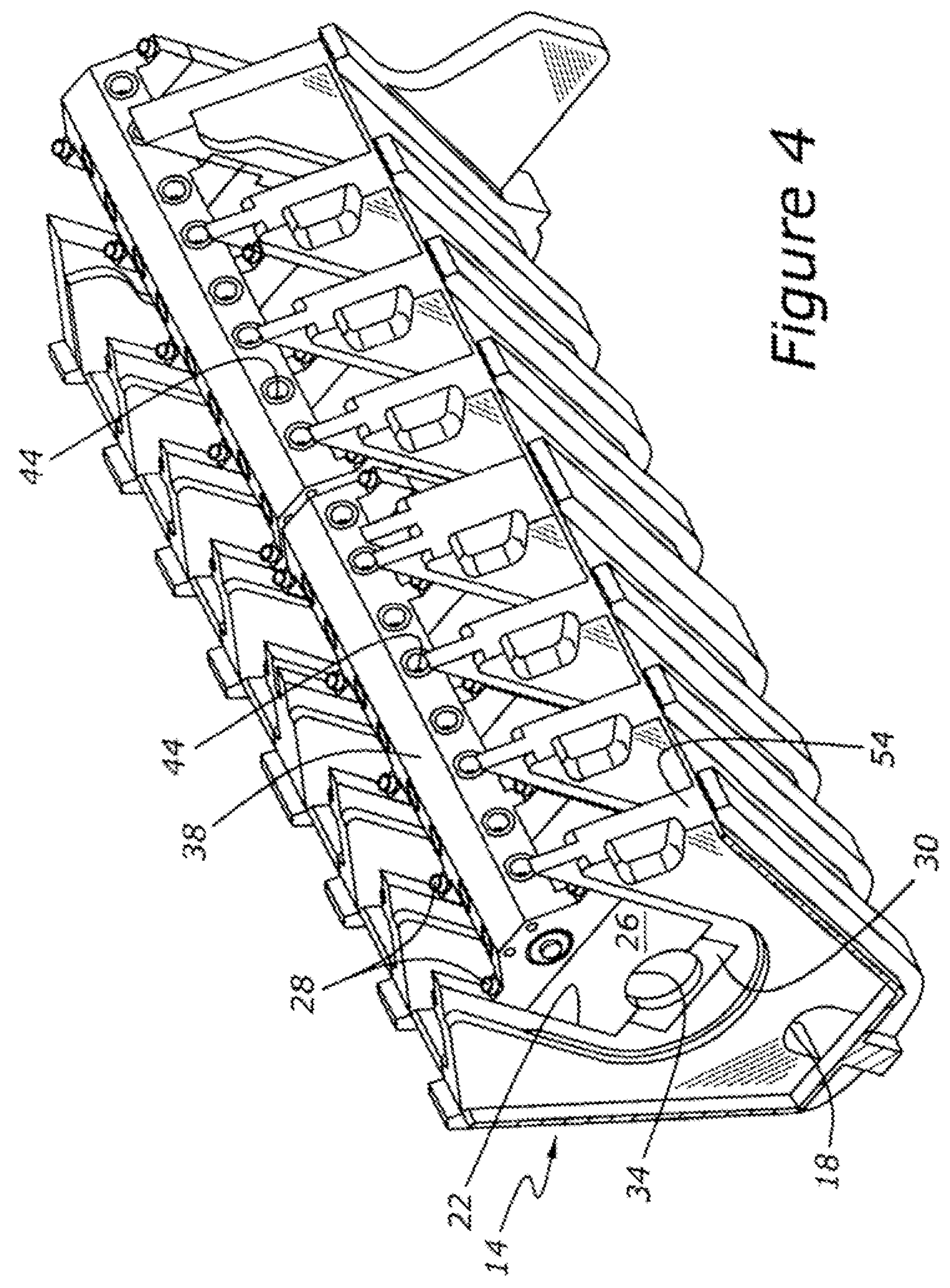
FIG. 4 is a perspective view of an assembled cylinder block according to an aspect of the present invention.

As shown in FIGS. 1 and 2, engine 10 is assembled into the upper portion of a carrier base, 14. Carrier base 14 has a lower portion configured as a crankcase, 18, and an upper portion having a number of upwardly directed assembly provisions, such as crankshaft bay 22 (FIGS. 2 and 4). During assembly of engine 10, crankshaft 24 is bedded into crankshaft bay 22 of carrier base 14 by first installing a number of lower bearing sections, 30, which are shown in FIGS. 1, 2 and 4. Bearing sections 30 may be secured by recessed cap screws (not shown) or alternatively, they may be configured to slide and lock into grooved portions of crankshaft bay 22. Once lower bearing sections 30 have been installed in crankshaft bay 22, along with an appropriate bearing insert (not shown), crankshaft 24 may be lowered into place and then secured with a number of main bearing caps 26. Main bearing caps 26 are secured with cap screws 28, which also serve to mount camshaft carrier 38 to the upper plane or upper surface of main bearing caps 26. Both cam carrier 38 and main bearing caps 26 are held in place within crankshaft bay 22 by a number of cap screws 28.

After crankshaft 24 has been mounted within carrier base 14, piston and connecting rod assemblies may be attached to crankshaft 24. Pistons 64 are mounted upon connecting rods 68. Each of connecting rods 68 has two bolts, 72, (FIG. 1), which are attached from the top of engine 10, through an upper portion of carrier base 14, into connecting rod caps 70, so as to attach connecting rods 68 and pistons 64 to crankshaft 24. After pistons 64 and connecting rods 68 have been attached to crankshaft 24, each of the individual cylinder assemblies, 50, may be installed. This begins with the sliding engagement of cylinders 52 with their respective pistons 64 and cylinder decks 54. After cylinders 52 are placed into contact with cylinder decks 54, cylinder heads 56 will be secured to cylinders 52 with cap screws, 58, extending through cylinder heads 56 and cylinders 52 and through cylinder decks 54 into the structure of carrier base 14. Rocker covers 60 are then mounted to cylinder heads 56.

Figure 3:
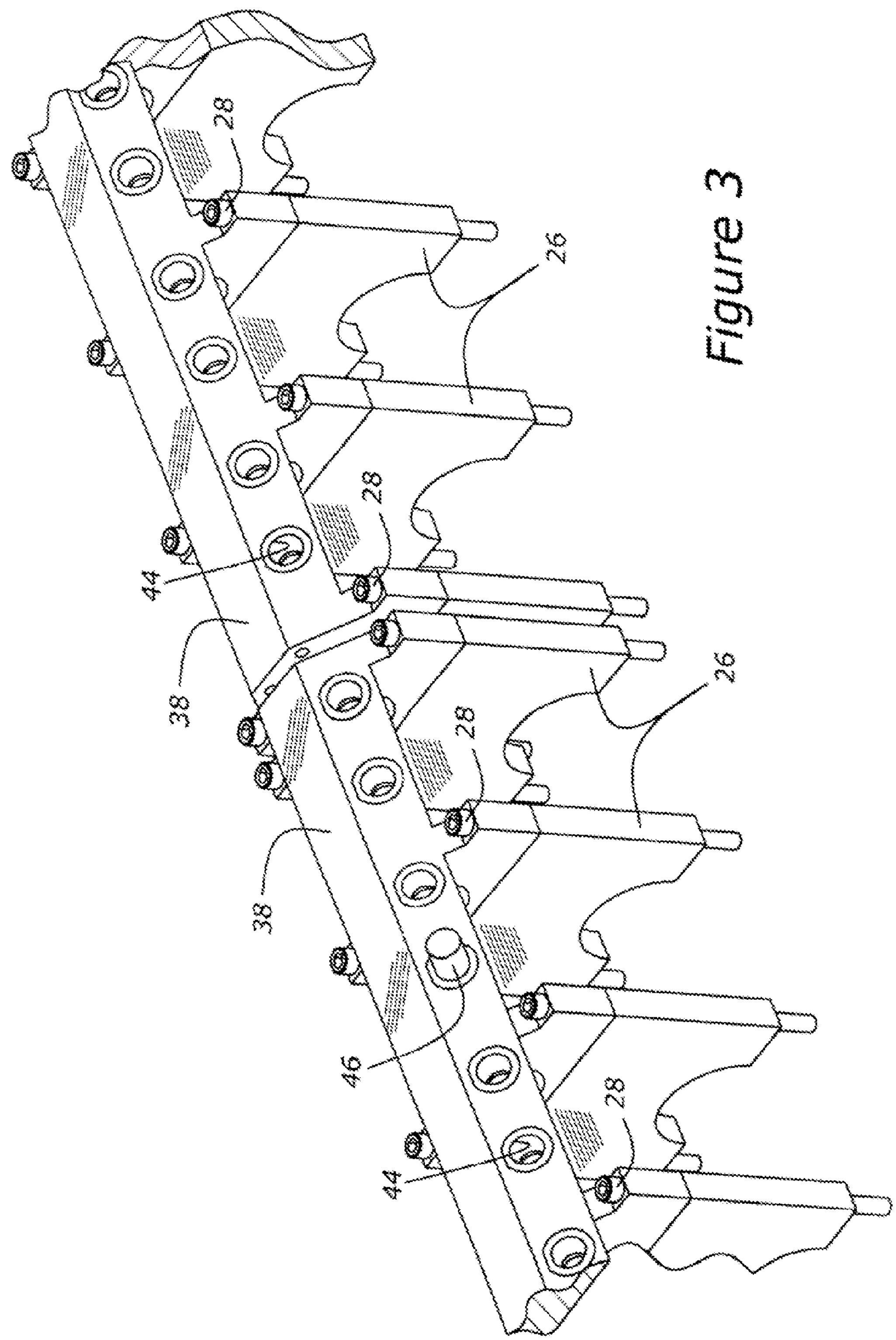
FIG. 3 is a perspective view of a camshaft carrier and also showing main bearing caps according to an aspect of the present invention.

FIG. 3 shows additional details of main bearing caps 26, cap screws 28, and camshaft carriers 38. It is noted, too, that lifter bores 44 are formed in camshaft carrier 38 for the purpose of housing valve lifters such as that shown as item 46. Camshaft 42 is journaled upon a number of bearings (not shown) which are contained within camshaft carriers 38. Although two separate camshaft carriers 38 are shown, a single, longer, carrier 38 may be employed.

FIG. 4 shows an assembled cylinder block according to an aspect of the present invention. Cap screws 28, which are used to retain crankshaft 24 are shown, as are main bearing caps 26 and lower bearing sections 30, which taken together, form main bearing bores 34. It is seem from FIG. 4 that if a main bearing bore 34 becomes damaged due to a spun bearing, for example, replacement of main bearing caps 26 and lower bearing sections 30 will completely renew bearing bore 34, without the need for onsite machining, or for that matter, scrapping of carrier base 14.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for top-loaded assembly of an internal combustion engine, comprising:

providing a carrier base having a lower portion configured as a crankcase, and an upper portion configured with a plurality of assembly provisions; and mounting a crankshaft within a crankshaft bay located within said upper portion of said carrier base, with said crankshaft bay being located between two cylinder banks, and, with said crankshaft being secured by a plurality of main bearing caps, said mounting step including lowering said crankshaft directly into said crankshaft bay from above.

2. The method according to claim 1, further comprising mounting a camshaft carrier engine said upper portion of said carrier base upon said plurality of main bearing caps.

3. The method according to claim 1, further comprising mounting a plurality of cylinder assemblies upon a plurality of cylinder decks located upon the upper portion of said carrier base adjoining said crankshaft bay.

4. The method according to claim 3, further comprising mounting a plurality of piston and connecting rod assemblies within the upper portion of said carrier base, with each connecting rod of said piston and connecting rod assemblies being attached to the crankshaft and to a respective one of said pistons, and with each piston being housed within a respective one of said cylinder assemblies.

5. The method according to claim 1, further comprising mounting a plurality of piston and connecting rod assemblies within the engine, with said connecting rods being attached to the crankshaft through an upper portion of the carrier base.

6. The method according to claim 5, further comprising mounting a plurality of cylinder assemblies upon a plurality of cylinder decks located upon the upper portion of said carrier base adjoining said crankshaft hay, with lower portions of said cylinder assemblies being first slidably engaged with said pistons.

* * * * *